United States Patent [19]

Schmidt et al.

[11] Patent Number: 4,483,831

[45] Date of Patent: Nov. 20, 1984

[54] METHOD AND APPARATUS FOR CALCINING LIME

[75] Inventors: Martin Schmidt, Bochum-Oberdahlhausen; Walter Köhler, Bochum; Andris Abelitis, Rösrath, all of Fed. Rep. of Germany

[73] Assignee: Klöckner-Humboldt-Deutz AG, Fed. Rep. of Germany

[21] Appl. No.: 402,315

[22] Filed: Jul. 27, 1982

[30] Foreign Application Priority Data

Aug. 5, 1981 [DE] Fed. Rep. of Germany ....... 3131023

[51] Int. Cl.$^3$ .............................................. C01F 11/06
[52] U.S. Cl. ..................... 423/175; 106/100; 422/189; 422/233; 423/637; 432/14; 432/15; 432/58
[58] Field of Search .................. 423/175, 177, 637; 432/14, 15; 106/100

[56] References Cited

U.S. PATENT DOCUMENTS

| | | | |
|---|---|---|---|
| 3,203,681 | 8/1965 | Rosa et al. | 106/100 |
| 3,212,764 | 10/1965 | Muller et al. | 106/100 |
| 3,796,791 | 3/1974 | Nielsen et al. | 423/175 |
| 3,862,294 | 1/1975 | Engelhart et al. | 423/155 |
| 4,031,183 | 6/1977 | Rourke | 423/175 |
| 4,098,871 | 7/1978 | Schoppe | 423/177 |
| 4,127,406 | 11/1978 | Kreft et al. | 432/15 |
| 4,187,071 | 2/1980 | Brachthauser et al. | 106/100 |
| 4,210,632 | 7/1980 | Rourke | 423/175 |
| 4,220,631 | 9/1980 | Serbent et al. | 423/175 |

OTHER PUBLICATIONS

Reh, "Fluidized Bed Processing", *Chemical Engineering Progress*, vol. 67, No. 2 (Feb. 1971, pp. 58–63.
Boynton, *Chemistry and Technology of Lime and Limestone*, Interscience Publishers (1966), pp. 138, 139.

*Primary Examiner*—John Dell
*Assistant Examiner*—Wayne A. Langel
*Attorney, Agent or Firm*—Hill, Van Ganten, Steadman & Simpson

[57] ABSTRACT

A method and apparatus for calcining lime, dolomite or similar materials in which the raw material to be calcined is preheated in a preheating zone by exhaust gases from a calcining zone, cooled by means of combustion air in a cooling zone, the combustion air passing from said cooling zone into said calcining zone and then into the preheating zone. A specific improvement of the invention resides in adding fuel in the calcining zone at a plurality of spaced locations along the calcining zone in the direction of flow of the combustion air therethrough.

8 Claims, 3 Drawing Figures

METHOD AND APPARATUS FOR CALCINING LIME

BACKGROUND OF THE INVENTION

1. Field of the Invention

The present invention is in the field of calcining of lime, dolomite, and similar materials used in the manufacture of cement. It involves a modification of the conventional system in which the raw material to be calcined is preheated, calcined, and then cooled.

2. Description of the Prior Art

In German Pat. No. 1,218,927 there is shown a method and apparatus for calcining lime, dolomite, and the like in which combustion air which has been preheated in the cooler is supplied to a calcining chamber and is utilized there. Following the calcining chamber, the combustion gas stream generated therein is divided into two sub-streams which are used to thermally treat the input raw material in the desired manner in horizontal calcining segments. Bypass conduits provided with throttle valves and the like divide the combustion gases emerging from the combustion chamber into individual sub-streams. Disposed at the end of the calcining segments are cyclones from which the calcined product proceeds into the cooler. A circulating cycle is provided for a portion of the combustion gases and of the calcined material.

SUMMARY OF THE INVENTION

The present invention seeks to significantly simplify the known calcining method and apparatus and to thereby improve its thermal efficiency. The objective of the invention is to enable the employment of solid fuels with a relatively low calorific value in the calcining operation. This objective is achieved by supplying the relatively low-grade fuel into the calcining zone at a plurality of locations in sequence in the flow direction of the gases.

In a further development of the present invention, the preheated raw material travels through the calcining zone in concurrent flow, preferably vertically, with the gases. The concurrent flow arrangement allows a particularly thorough and gentle thermal treatment of the material so that the existence of excess temperatures can be avoided even with direct fuel introduction into the calcining zone. It is particularly advantageous to have the greatest part of the fuel added at the beginning of the calcining zone and smaller fuel amounts added in the subsequent portions of the calcining zone. Excessive temperatures are thereby avoided without difficulty.

A further development of the invention resides in supplying the material by means of mechanical pulsation, controlled as to amplitude and frequency, to the calcining zone and/or to the preheater. The pulsating feed exhibits a frequency of from 0.5 to 5 Hz, and preferably in the range from 1 to 3 Hz. As a result of the pulsating feed in the specified frequency range, it is possible to improve the quality of the calcined products and in particular to achieve a stable material and gas throughput through the system without undesirable gas circulations.

In the preferred form of the invention, the fuel is supplied to the calcining zone in at least two and preferably in three or four vertical levels. In this way, a particularly favorable arrangement is achieved for calcining in that the energy supplied to the calcining zone is related to the energy requirement in individual portions of the calcining zone. Advantageously, the greatest part of the combustion energy (50% to 70%) is added at the beginning of the concurrent flow calcining segment.

In a further feature of the present invention, the calcining zone is traversed in multiple fashion by the material, at least in a minor amount. By doing so, the quality of the calcined material can be improved.

In a still further embodiment of the invention, solid fuels are used in the calcining zone, and an afterburner is provided beyond the calcining zone utilizing a gaseous or liquid fuel. With this arrangement, the use of relatively low-grade fuels such as brown coal, oil shale and the like is possible, and a complete burnout of the solid fuel can be achieved to provide full exploitation of its calorific value.

Still another embodiment of the present invention provides for a stabilization treatment of the material after its passage through the calcining zone, the stabilization being carried out at a constant temperature. This serves to stabilize the CaO lattice. By the provision of the stabilizing treatment, short transit time through the actual calcining zone can be used without a relatively long dwell time for the formation of a stable, uniform CaO lattice. The quality of the calcined product is improved by this stabilization treatment.

The apparatus of the present invention provides a preheater for the raw material, particularly a cyclone heat exchanger, and a cooler for the calcined product, also consisting of a cyclone heat exchanger. Between the two there is a calcining device which is designed as a vertical column with at least two combustion fuel feed devices in spaced vertical arrangement therealong. This provides a particularly simple combustion device which can be directly put in place on the cooler without bypasses for the gas and which can likewise be directly introduced into the preheater or with an end loop. This makes possible a single-line, linear gas conduction path through the system consisting of the cooler, calciner, and preheater which is capable of careful control.

In a further development of the invention, control devices are provided for achieving a pulsating feed of the material stream, particularly mechanical devices. These are disposed at the cyclone discharges and, in particular, at the entry location of the material into the vertical ascending column. The control devices are preferably in the form of pendulum flaps with a drive device connected thereto which controls the amplitude and the frequency. As a result of the pulsating material feed, there is a surprising significant improvement in the calcining result. Because of the controllability feature, the system can be adapted to different material compositions by setting a pulsation frequency corresponding to the specific requirements.

In a further embodiment of the invention, the beginning and the end of the calcining zone are connected to each other by a material return conduit which branches off from the material conduit to the cooler by means of a material shunt. In this way, it is possible to add a specific sub-flow into the cooler and to conduct the remainder of the material through the calcining segment in suitable circulation. This also improves the uniformity of the calcined product.

In a preferred embodiment of the invention, an after-treatment chamber such as an indirectly heated swirl chamber is provided between the end of the calcining zone and the cooler. The after-treatment of the calcined product stabilizes the CaO lattice by tempering the same at a relatively uniform temperature. The indirect heating of the calcining chamber prevents a subsequent chemical reaction with combustion gases from occurring. This is particularly advantageous when the heating is done either indirectly by means of heat-exchanger elements or directly by means of infrared radiation.

Lastly, there is provided a calcining device which has at least two solid fuel supply devices therein, and an afterburning device which is fed with liquid or gaseous fuels. The afterburning device makes it possible to use solid fuels which have poor combustion products and still secure a complete burnout of the solid fuels without the low melting point of lower grade fuels being exceeded. As a result, foreign deposits are avoided and the thermal efficiency of the overall system is increased.

BRIEF DESCRIPTION OF THE DRAWINGS

The invention is explained in greater detail on the basis of the accompanying drawings which show a preferred embodiment.

DESCRIPTION OF THE PREFERRED EMBODIMENTS

Figure 1:
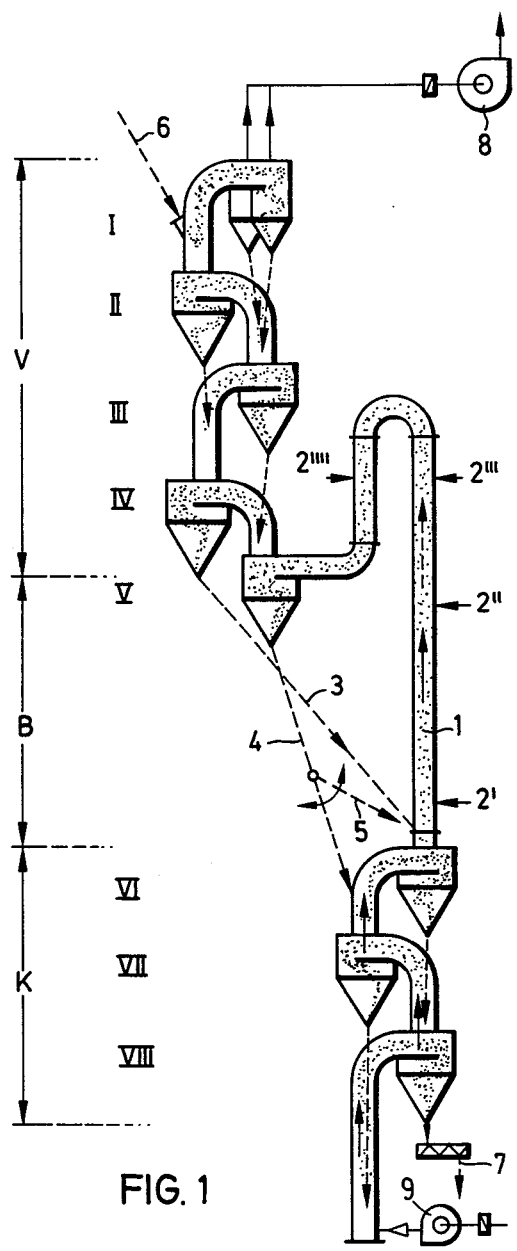
FIG. 1 illustrates a calcining system having a single calcining zone.

In FIG. 1, there is shown a preheater V equipped with individual or double cyclones I, II, III, and IV. The raw material input is identified by a dashed line 6. Pendulum flaps, pivoted flaps or the like (not shown) provide pulsating movement of the material and are situated on the discharge sides of the cyclones. In the calcining area or zone B below the preheater V, a generally vertical calcining column 1 having a separating cyclone V is provided, which may take the form of a simple ascending stack according to the present invention. Leading into the ascending stack 1 are fuel supply devices 2', 2'', 2''' and 2'''' at a plurality of locations following one another in the upward and onward flow direction of gas passing through the calcining zone and into which metered amounts of fuel such as fine-grained coal, coal dust or the like are introduced. The largest amount of the fuel component is introduced at the lowest fuel supply device 2' since the thermal requirements are greatest there. In keeping with the decreasing thermal requirements, the amount of added fuel decreases progressively at the subsequent fuel combustion locations 2'', 2''', and 2''''.

There is also provided a cooler stage K consisting of a three-stage cyclone heat exchanger with cyclone stages VI, VII, and VIII disposed below the calcining column 1.

The calcined material collects in the cyclone stage V and is supplied through a conduit 4 either directly to the cooler or through a material shunt selectively as indicated by dashed line conduit 5 to the vertical column 1. The preheated raw material proceeds from the cyclone stage IV of the preheater through the conduit 3 indicated with dashed lines to the lower side of the column 1 closely adjacent to the lowest of the fuel supply location means 2' for immediate calcining effect at such lowest location 2'. An oscillating pendulum flap or the like is also preferably provided at this inlet. A pair of blowers 8 and 9 which are adjustable blowers provide for conveying the combustion air through the overall system. The fully calcined material is extracted from the cyclone stage VIII which is the lowest cooling cyclone by means of a discharge device 7 such as a screw conveyor.

Figure 2:
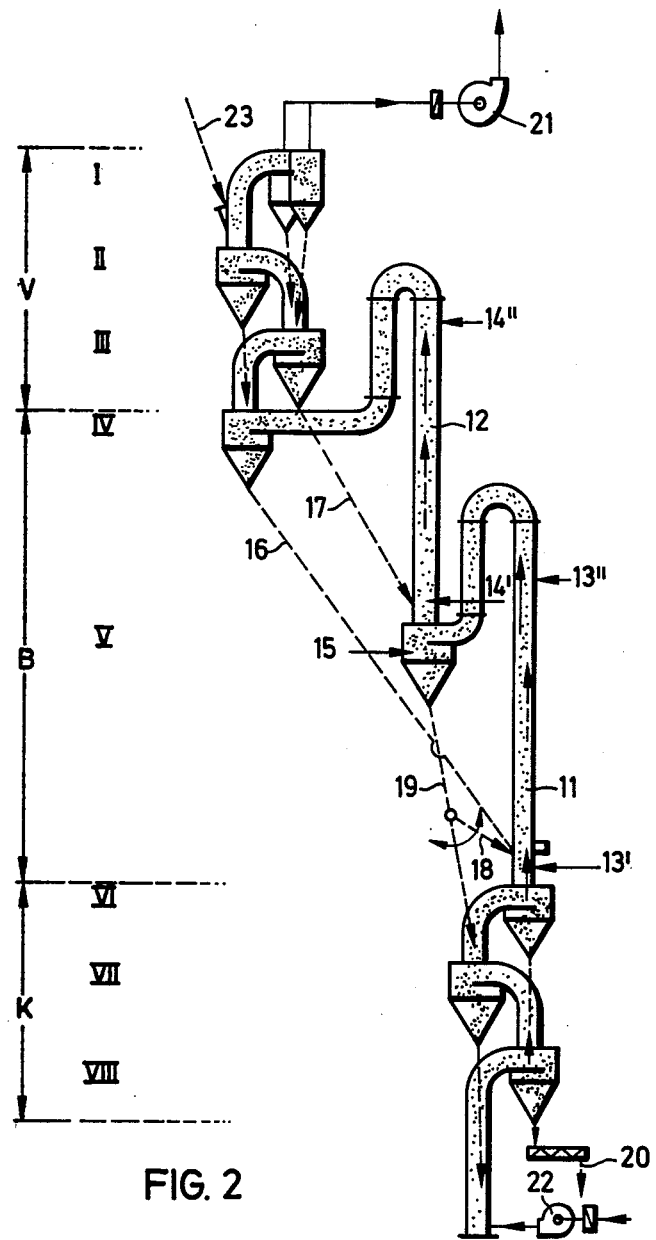
FIG. 2 shows a system for calcining which has two calcining zones.

In FIG. 2 there is illustrated a modified form of the present invention. There is shown a cyclone V which is provided with a combustion location 15, in combination with calcining means which consist of two ascending columns 11 and 12. These have fuel input locations 13', 13'', 14' and 14'', respectively. This embodiment is particularly useful when relatively high ash and/or coarse-grained fuel is employed. About 60% to 90% of the overall fuel amount can be introduced through the fuel input locations 13', 13'', 14' and 14''. The combustion location 15 provides an afterburning stage and is advantageously fueled with gaseous or liquid fuels in order to obtain a complete burning of the unburned solid fuel particles. The material is introduced by means of an inlet line 23 and then traverses the various cyclone stages. Conduits 16 and 17 are provided to deliver the material from the cyclone stages III and IV. Conduits 18 and 19 which selectively supply controllable amounts to the cooler or to the lower end of the ascending column 11 are provided at the discharge ends of the cyclones.

In this embodiment, the poorest grade of fuel is introduced through the input locations 14' and 14'' where it has the possibility of being completely burned out in the ascending column 11. The combustion air which likewise travels linearly in the system is conveyed by the blowers 21 and 22. The completely calcined product is extracted by a conveying device 20 from the bottom cyclone VIII.

Figure 3:
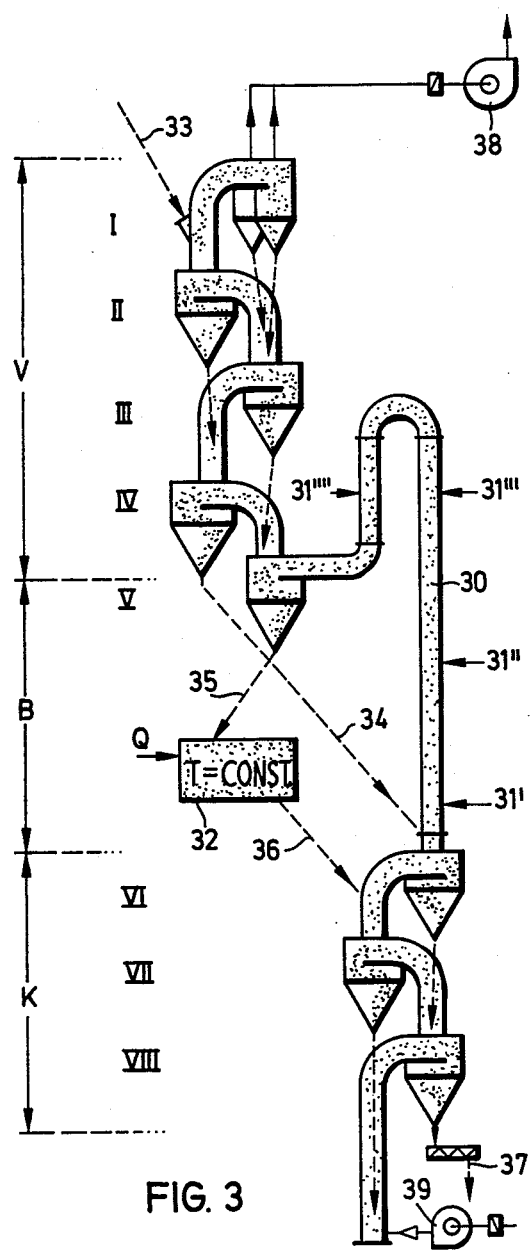
FIG. 3 shows a calcining system with a calcining zone followed by an isothermal after-treatment device.

A variation for producing a calcined product with a stabilized CaO lattice is shown in FIG. 3. The material charging takes place at inlet 33, and the fuel introduction occurs at combustion locations 31', 31'', 31''' and 31''''. The material traverses the cyclone stages I, II, III, and IV and then proceeds through a line 34 indicated by dashed lines into the lower end of the ascending column 30. Deviating from FIG. 1, however, the finally calcined product is supplied from the cyclone V by means of a conduit 35 to a tempering or heat-treatment chamber 32 where it remains for a predetermined dwell time. In order to compensate for the radiation, the tempering chamber 32 has heat supplied to it as shown by the arrow Q such, for example, as by means of infrared radiation or by means of thermal emission from a heat exchanger. The tempered material proceeds through a conduit 36 indicated with dashed lines into the cooler which contains cyclone stages VI, VII and VIII. The finally calcined product is extracted from the cyclone stage VIII by means of a conveying means 37. The combustion air is conveyed by a pair of blowers 38 and 39.

The method and apparatus of the present invention are particularly suited for calcining lime in relatively small systems. Within the scope of the present invention, however, large-scale systems can also be improved with the provision of the present invention with its controlled calcining conditions and distributed heat introduction.

It should be evident that various modifications can be made to the described embodiments without departing from the scope of the present invention.

We claim as our invention:

1. In a method for calcining calcium bearing raw material in which finely divided raw material is successively treated in a preheating zone, a generally vertical calcining zone, and a cooling zone wherein the finely divided raw material is preheated in said preheating zone by exhaust gases from said calcining zone, passed through said calcining zone, and then in suspension through said cooling zone, the entire amount of cooling air being supplied directly from the cooling zone into the calcining zone as combustion air, the improvement which comprises:

adding fuel to said generally vertical calcining zone at a plurality of locations following one another in the upward and onward flow direction of the gas passing through said calcining zone, introducing the preheated raw material closely adjacent to the lowest of said locations for immediate calcining effect at said lowest location, and passing the preheated raw material vertically upwardly through the calcining zone in concurrent flow with the fuel and while suspended in the gas stream.

2. A method according to claim 1 which includes the step of:

mechanically pulsing the raw material to be calcined into the calcining zone.

3. A method according to claim 3 in which:

said pulsing occurs at a frequency of from 0.5 to 5 Hz.

4. A method according to claim 2 in which: said pulsing occurs at a frequency of from 1 to 3 Hz.

5. A method according to claim 1 which includes the step of:

adding said fuel at from 3 to 4 different location levels along said calcining zone.

6. A method according to claim 1 which includes the steps of:

adding a solid fuel at said plurality of spaced locations in said combustion zone, and subjecting the calcined material to post-combustion with a gaseous or liquid fuel.

7. A method according to claim 1 which includes the step of:

subjecting the material after calcination to a stabilization treatment at constant temperature.

8. A method according to claim 1 which includes the step of:

supplying the majority of the fuel at the beginning of the calcining zone and smaller amounts of fuel to succeeding portions of the calcining zone.

* * * * *